United States Patent [19]

Kitamura

[11] Patent Number: 4,995,579
[45] Date of Patent: Feb. 26, 1991

[54] ANGLE ADJUSTMENT DEVICE IN DISPLAY DEVICE

[75] Inventor: Yoshiharu Kitamura, Komagane, Japan

[73] Assignee: NHK Spring Co. Ltd., Yokohama, Japan

[21] Appl. No.: 359,884

[22] Filed: Jun. 1, 1989

[30] Foreign Application Priority Data

Jun. 11, 1987 [JP] Japan .................. 62-90215

[51] Int. Cl.$^5$ ............................. H04N 5/64
[52] U.S. Cl. ..................... 248/284; 248/919; 16/337
[58] Field of Search ......... 248/284, 291, 917, 184, 248/292.1, 919–923; 358/254; 16/302, 305–307, 337, 339

[56] References Cited

U.S. PATENT DOCUMENTS

| | | | |
|---|---|---|---|
| 916,528 | 3/1909 | Broome | 16/339 X |
| 3,593,952 | 7/1971 | Smith | 248/284 X |
| 3,845,928 | 11/1974 | Barrett et al. | 248/291 |
| 4,438,458 | 3/1984 | Munscher | 248/184 X |
| 4,730,364 | 3/1988 | Tat-Kee | 16/337 |
| 4,768,744 | 9/1988 | Leeds et al. | 248/284 X |
| 4,771,979 | 9/1988 | Nakazawa et al. | 248/292.1 |
| 4,803,560 | 2/1989 | Matsunaga et al. | 358/254 X |
| 4,834,329 | 5/1989 | Delapp | 248/292.1 X |

FOREIGN PATENT DOCUMENTS

| | | | |
|---|---|---|---|
| 18393 | 11/1913 | France | 16/302 |
| 34771 | 2/1984 | Japan | 358/254 |

Primary Examiner—Alvin C. Chin-Shue
Attorney, Agent, or Firm—Fleit, Jacobson, Cohn, Price, Holman & Stern

[57] ABSTRACT

An angle adjustment consists of an arm having a first axis fixed to a main body which supports a display so as to vertically stand up and a second axis allowed to stand up the display by rotation by connecting it to the display, a spring which energizes the second axis so as to rotate in the standing up direction of the display, a spring which locks the inclining falling down of the display by friction force being downwardly inserted into the first axis in a closely contact state, and a stopper mechanism which restricts a rotation angle of the second axis when the display vertically stands up by the spring. The angle adjustment vertically of the display is performed around the first axis by a loading force more than the friction force of the locking spring by the energized force of the spring.

5 Claims, 3 Drawing Sheets

ANGLE ADJUSTMENT DEVICE IN DISPLAY DEVICE

BACKGROUND OF THE INVENTION

This invention relates to an angle adjustment device for electronic displays such as personal computer, word processor and the like.

In the above device, the indications of programs and data are provided by displays such as CRT (cathode-ray tube) and the like. The screen should be conveyed by a main body so as to be capable of an angle adjustment. Accordingly, a device for angle adjustment of a display is included therein. As such device, a ratchet mechanism has been used. However, in the device wherein the ratchet mechanism is used, the adjustment thereof is step by step and fine adjustment is impossible. Accordingly, such device necessitates a large attaching space. Further, in case of folding type construction of the display into a body, it is necessary to light up the body from folding state to standing up state. Accordingly, energized means such as a gas spring, or the like is necessary, which complicates the construction.

OBJECT OF THIS INVENTION

A first object of the invention is to provide an angle adjutment device which performs the angle adjustment of the display from a folded state to an standing up state automatically.

A second object of this invention is to provide an angle adjustment device which makes the display device stand up automatically from a folded state.

A third object of this invention is to provide an angle adjustment device which provides automatic standing up and angle adjustment of the display with a spring.

A further object of this invention is to provide an angle adjustment device which can stop an automatic standing up of the display of the display device at a selected angle.

SUMMARY OF THE INVENTION

This invention is, by being provided with claim 1, to rotate the second axis by aid of the spring energy to be allowed to stand up the display automatically, and to perform an angle adjustment of the display by the rotation of the arm to the first axis and then perform the locking after the angle adjustment by aid of the friction force of the locking spring to the fixed axis.

Further, the automatic standing up of the display is adapted to stop at a fixed angle by the operation of the stopper mechanism.

BRIEF DESCRIPTION OF THE DRAWING

The feature of this invention described above can be sufficiently understood by referring to the accompanying drawing.

In figures,

FIG. 2 is a sectional view taken on line II—II in; FIG. 2 is a side view on the left side of the above angle adjustment device.

DETAILED DESCRIPTION OF THE INVENTION

Figure 1:
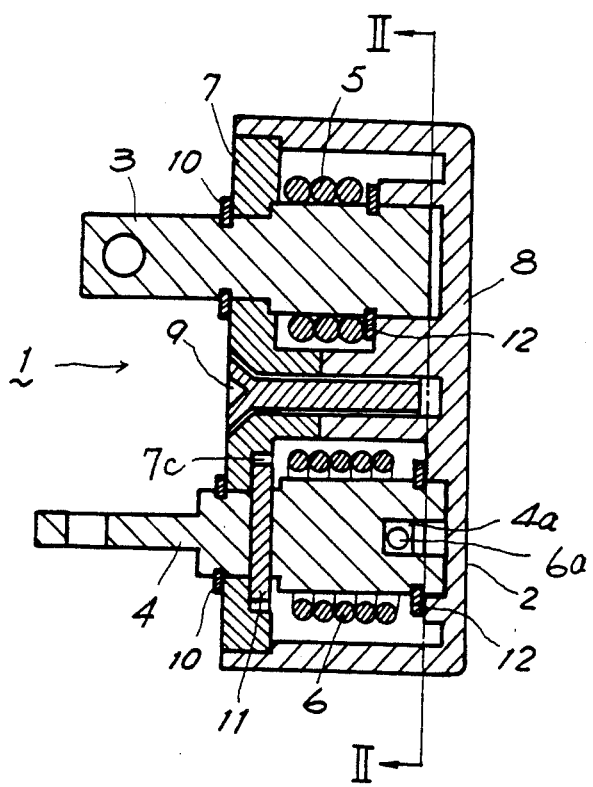
FIG. 1 (A) is a sectional view which shows an angle adjustment device according to an example of this invention.
Figure 2:
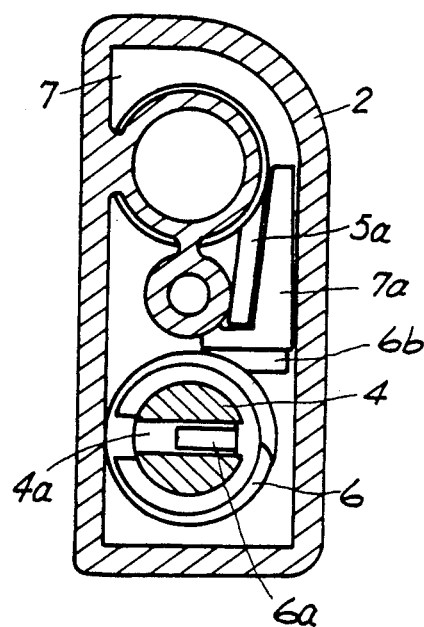
Figure 3:
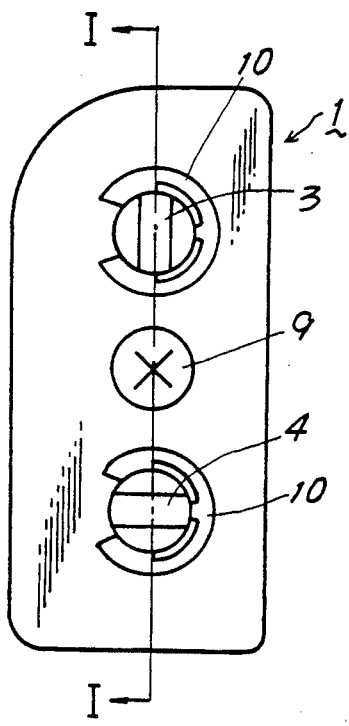
FIG. 3 is a side view of FIG. 1.

An angle adjustment device which is an example of this invention will be described by reference to FIG. 1, FIG. 2 and FIG. 3.

Angle adjustment device 1 consist of an (arm) 2 which forms a casing, first and a second shafts 3,4 inserted in parallel into the arm 2 and a locking spring 5 and a spring 6 inserted around shafts 3 and 4 respectively. The arm 2 is formed by inserting a cover 8 having a reversed E shape in section into a base sheet 7 and screwing down with a screw 9. The first and the second shafts 3 and 4 project from arm 2 in a same direction, the projected end portion of the first shaft 3 being fixed to the main body 22 of the display device 20 while the projected end portion of the second shaft 4 being connected to the display 1 of the display device 20. The numeral 10 is an O ring inserted into each shaft 3, 4 in order to prevent the pulling out of each shaft 3, 4.

Figure 4:
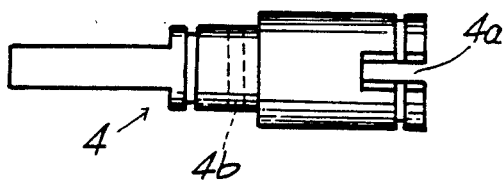
FIG. 4 is a side view which shows a whole of the second axis used for this invention.
Figure 5:
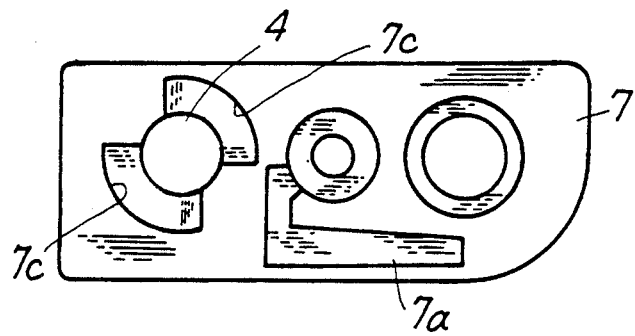
FIG. 5(A) and (B) are a plan and a side view respectively which represent a base sheet which is a portion of the arm used for this invention.
Figure 5:
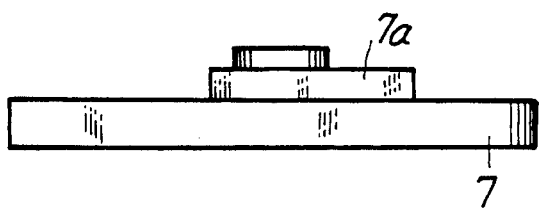
Figure 6:
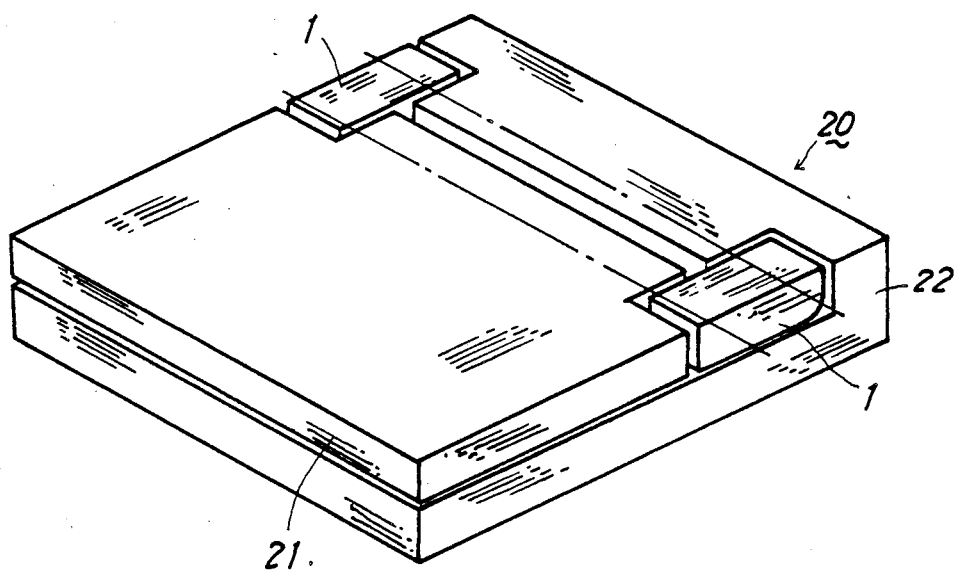
FIG. 6 is a perspective view which shows a folded state of the display device provided with an angle adjustment device of this invention.

The locking spring 5 is outwardly inserted into the inserting portion of the arm 2 in the first shaft 3. The locking spring 5 is wound so as to have a slightly smaller diameter than the outer diameter of the inserting portion of the first axis 3, and when inserting the spring into the first shaft 2, the locking spring 5 is slightly enlarged in diameter thereof and after the insertion it is closely attached to the first axis 3 so as to provide a friction force between the spring and shaft. One end 5a of the locking spring 5 is extended into the arm 2, while another end (not shown) forms a free end. A torsion spring is used as spring 6 inserted onto the second shaft 4, the coil portion thereof being loosely inserted into the arm inserting portion of the second axis 4. Further, a slit 4a is formed in a diameter direction of the second axis 4, within the slit 4a being inserted one end 6a of the spring. Furthermore, another end 6b of the spring 6 is extended into the arm 2. At the base sheet 7 of the arm 2, is formed a convex 7a having approximately a L shape as shown in FIG. 5. One end 5a of the locking spring 5 and another end 6b of the spring 6 abut against the convex 7a. Further, a penetrated hole 4b in the diameter direction is formed at the second axis 4 as shown in FIG. 4, said penetrated hole being provided with a stopper pin 11 as shown in FIG. 1. The ends of the stopper pin 11 project from the penetrated hole 4b to. At the base sheet 7 corresponds to this projective portion, a fan- or sector-shape stopper groove 7c is formed (FIG. 5). The stopper pin 11 and the stopper groove 7c constitutes a stopper mechanism and the rotation of the cecond axis 4 is restricted by the length of the stopper groove 7c. By this means, a standing angle of the display 21 is restricted within a fixed range. In FIG. 1, the numeral 12 is a stop ring which supports the first axis 3 and the second axis 4 and is inserted into an arround groove provided at each shaft 3 and 4.

The display unit device 20 consists of a display 21 which performs an indication of a data and the like and a main body 22 which supports display 21. In this case, both ends of the lower portion of the display 21 is pivotally supported by main body, whereby the display is adapted to stand up from the main body. The angle adjustment device 1 is secured to the pivotally supported portion, thereby performing the raising up and the angle adjustment of the display 21. In securing, the first shaft 3 is inserted into the main body 22 to be fixed and the second shaft 4 is connected to the display 21. Further, in this example, the angle adjustment devices are disposed on both sides for the left and the right side in display 21.

Figure 7:
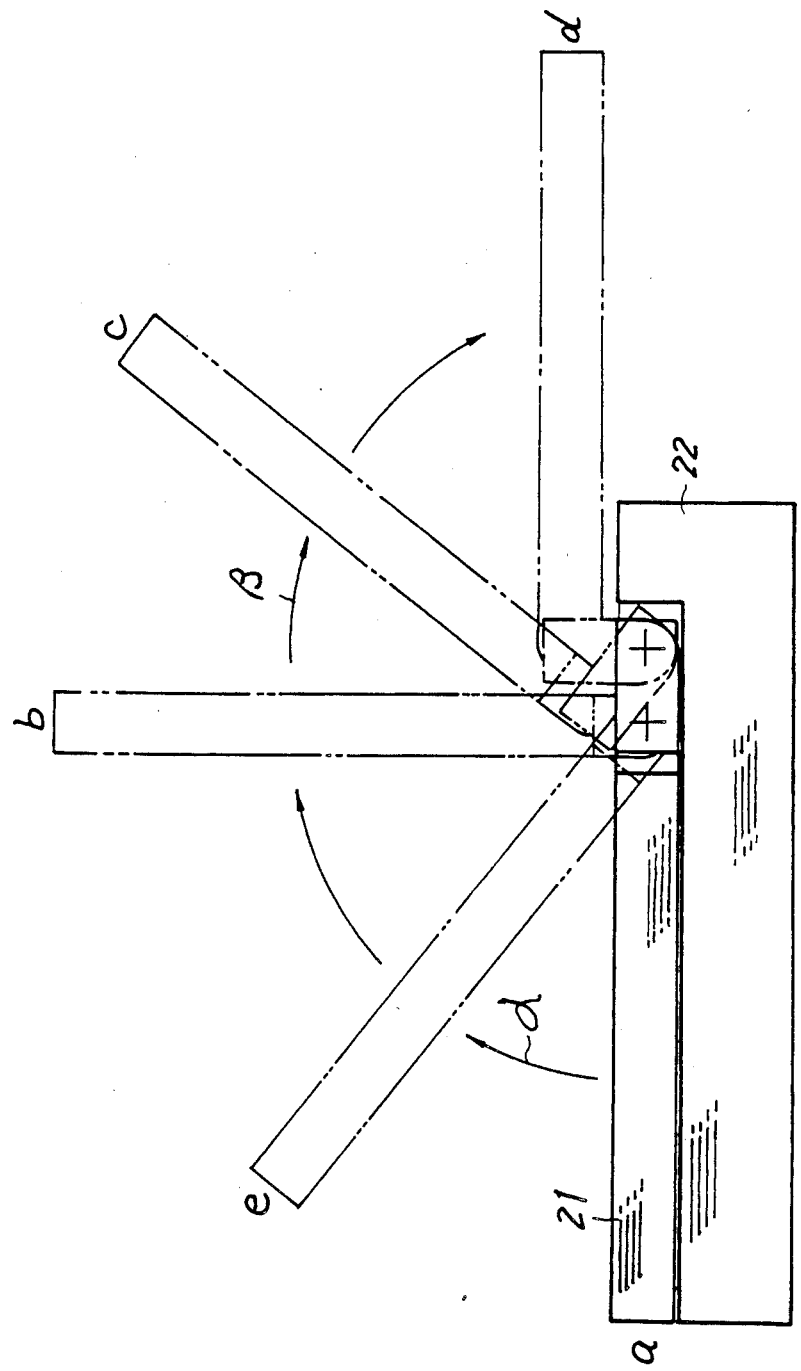
FIG. 7 is a side view which shows an action of the device shown in FIG. 6.

Then, the operation of this example will be described according to FIG. 7. In a state wherein the display 21 is folded on the main body 22(FIG. 7, a), the display 21 is energized in a standing up direction by the energy stored in spring 6 attached to the second shaft 4. Accordingly, this folded state is maintained by a suitable locking mechanism. When this locking mechanism is removed, the second shaft 4 is rotated by spring 6, whereby the display 21 automatically stands up against the main body 22 as shown by an arrow A in FIG. 7. Such standing is stopped by the abutment of the stopper pin 11 having the stopper mechanism against the end surface of the stopper groove 7C of the base sheet 7, whereby the display 21 is vertically stood up as shown by b through point e in FIG. 7. Further, it is possible to be allowed to stand up at a suitable angle by changing the length of the stopper groove 7C appropriately. In order to adjust the angle of the display 21 from the the point b in FIG. 7, the display 21 is urged in B direction shown by an arrow the load is when the urging force than the friction force of the locking spring 5, the display does not rotate. However, when it is larger than the friction force of the locking spring 5, a slip occurs between the locking spring 5 and the first axis 3. This is because one end 6a of the locking spring 5 abuts against the convex 7a of the base sheet 7, whereby the load is transmitted to the locking spring 5 through the convex 7a. The arm 2 rotates with a center of the first axis 3, whereby the display 21 moves down toward the rear. Thus, when the load is removed after a preferable angle of an operator is obtained, the display 21 stops at the above inclined angle since the rotation of the arm 2 is locked by the friction force of the locking spring 5, whereby being able to perform an angle adjustment. Although such angle adjustment can be performed within a movable range of the display 21 (range of point b to point d in FIG. 7) fixed by design, non-step adjustment is possible since this adjustment is performed by the rotation of arm 2 with respect to the first axis 3. By this, a fine adjustment can be performed easily. Further, when the load is applied in the reversal direction within the movable range of display 21, the friction force due to the locking spring 5 decreases because this direction is one which returns back the winding of the locking spring 6. Accordingly, the restored operation of the display can be performed with a small force. Then, in order to change from a stand up state (point b FIG. 7) to folded state (point a in FIG. 7), it is possible to continue the load in the same direction to the display. In this case, although the second axis 4 rotates, the spring 6 is tightly wound due to the rotation of the second axis and the energy which is allowed to stand up the display 21 is stored therein since one end 6a of the spring 6 is latched to the second axis 4, while another end 6b abuts the convex, 7a of the base sheet 7. Such energy becomes a maximum in the folded state (point a) of the display 21, while the display 21 automatically stands up the above energy when the folded In the above constitution, it is possible to make the display to a lifting system since the restoration force of the spring is allowed to operate to the second axis to rotate the second axis, thereby being able to increase the operation ability. Further, since the angle adjustment is performed by availing the friction force of the locking spring, a non-step adjustment is possible, which enables a fine adjustment. Furthermore, the minimization and the simplification of the structure are possible because the jumping up of the display and the angle adjustment of the display are performed by the display.

It is clear that many apparently widely different embodiments of this invention described above may be made without departing from the spirit and scope thereof. Accordingly, this invention is not limited to the specific embodiments thereof except as defined in claims of the display with a simple construction and a second space can be also reduced. As described above, since this invention has a construction which performs angle adjustment of the display availing the friction force of the spring, non-step adjustment thereof is possible, which enables a fine adjustment. Further, since the restoring force of the spring operates to the second axis, the display can be made a jumping type, whereby the operation is improved to be simple in construction and the attached space can be also minimized.

In the above constitution, it is possible to make the display to a jumping system since the restoration force of the spring is allowed to operate to the second axis to rotate the second axis, thereby being able to increase the operation ability. Further, since the angle adjustment is performed by availing the friction force of the locking spring, a non-step adjustment is possible, which enables a fine adjustment. Furthermore, the minimization and the simplification of the structure are possible because the jumping up of the display and the angle adjustment of the display are performed by display.

It is clear that many apparently widely different embodiments of this invention described above may be made without departing from the spirit and scope thereof. Accordingly, this invention is not limited to the specific embodiments thereof except as defined in claims.

What I claim is:

1. An electronic display device comprising a main body, a display unit and an angle adjustment device connected between the main body and the display unit for lifting the display unit from the main body into a viewable position and enabling adjustment of the viewable position, the adjustment device comprising a pivot arm and secured to the main body, a second shaft journalled in the pivot arm in parallel with the first arm and secured to the display unit, a torsion spring connected between the pivot arm and the second shaft for urging the second shaft to rotate in a direction raising the display unit from the main body, a stop mechanism in the pivot arm for limiting the amount of rotation of the second shaft in said direction, and a lock spring in the pivot arm in frictional engagement with the first shaft allowing rotational adjustment of the pivot arm about the first shaft to provide said adjustment of the viewable position only when the frictional force of the lock spring is overcome.

2. A device as claimed in claim 1 wherein the lock spring comprises a helical spring surrounding the first shaft and having an end portion fixed in the pivot arm.

3. A device as claimed in claim 1 wherein the stop mechanism comprises a part circular recessed segment formed on an interior wall of the pivot arm coaxial with the second shaft, and a radial pin carried by the second shaft and located in said segment.

4. A device as claimed in claim 3 wherein the pivot arm has a removable cover defining said interior wall whereby the cover can be replaced by another cover having a segment of different angular extent.

5. A device as claimed in claim 1 wherein the torsion spring comprises a helical spring surrounding the second shaft and having one end fixed relative to the second shaft and an opposite end fixed relative to the pivot arm.

* * * * *